US011014291B1

(12) United States Patent
Susnjara

(10) Patent No.: US 11,014,291 B1
(45) Date of Patent: May 25, 2021

(54) METHODS AND SYSTEMS FOR PRODUCING BOAT MOLDS BY ADDITIVE MANUFACTURING

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/796,366

(22) Filed: Feb. 20, 2020

(51) Int. Cl.
B29C 64/118 (2017.01)
B33Y 10/00 (2015.01)
B33Y 30/00 (2015.01)
B29C 64/30 (2017.01)
B33Y 40/20 (2020.01)
B29C 33/38 (2006.01)
B33Y 80/00 (2015.01)
B29L 31/30 (2006.01)

(52) U.S. Cl.
CPC ........ *B29C 64/118* (2017.08); *B29C 33/3842* (2013.01); *B29C 64/30* (2017.08); *B33Y 10/00* (2014.12); *B33Y 30/00* (2014.12); *B33Y 40/20* (2020.01); *B33Y 80/00* (2014.12); *B29L 2031/307* (2013.01)

(58) Field of Classification Search
CPC ...... B29C 64/118; B29C 33/3842; B63B 5/24
See application file for complete search history.

(56) References Cited

U.S. PATENT DOCUMENTS

| 3,191,200 A * | 6/1965 | Fournillier | B29K 2067/00 114/357 |
| 3,300,355 A * | 1/1967 | Adams | B29D 99/001 156/189 |
| 4,118,814 A * | 10/1978 | Holtom | B29C 66/124 114/357 |
| 4,154,561 A * | 5/1979 | Virtanen | B29C 70/28 425/128 |
| 5,204,124 A * | 4/1993 | Secretan | B29C 64/124 425/145 |
| 6,490,990 B1 * | 12/2002 | Hamlyn | B63B 32/57 114/357 |
| 7,731,816 B2 | 6/2010 | Oldani et al. | |

(Continued)

OTHER PUBLICATIONS

Sudbury, Thomas Zeke, et al. "An assessment of additive manufactured molds for hand-laid fiber reinforced composites." The International Journal of Advanced Manufacturing Technology 90.5-8 (2017): 1659-1664. (Year: 2017).*

(Continued)

Primary Examiner — Galen H Hauth
(74) Attorney, Agent, or Firm — Bookoff McAndrews, PLLC

(57) ABSTRACT

An additive manufacturing method includes providing material to an extruder of an additive manufacturing apparatus, heating the material to form a flowable material, and depositing a first layer of the flowable material from a nozzle of the additive manufacturing apparatus to form part of a hull portion of a plug for a marine article. The method also includes depositing a second layer of the flowable material from the nozzle of the additive manufacturing apparatus to form part of a deck portion of the plug for the marine article.

20 Claims, 8 Drawing Sheets

(56) References Cited

U.S. PATENT DOCUMENTS

| | | | |
|---|---|---|---|
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 2005/0248065 A1* | 11/2005 | Owada | B29C 64/106 |
| | | | 264/494 |
| 2007/0044899 A1 | 3/2007 | Tingley | |
| 2008/0006017 A1 | 1/2008 | Rindels | |
| 2010/0200168 A1 | 8/2010 | Oldani et al. | |
| 2014/0048980 A1* | 2/2014 | Crump | B33Y 30/00 |
| | | | 264/401 |
| 2018/0050502 A1 | 2/2018 | Oldani | |

OTHER PUBLICATIONS

Sloan, "Big additive machines tackle large molds," CompositesWorld, Jun. 11, 2019, (8 pages).

* cited by examiner

METHODS AND SYSTEMS FOR PRODUCING BOAT MOLDS BY ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., marine items or components, automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including e.g., freeform fabrication, 3D printing, rapid prototyping/tooling, etc. Additive manufacturing techniques may be used to fabricate simple or complex components from a wide variety of materials. For example, freestanding objects can be fabricated from a computer-aided design (CAD) model.

A particular type of additive manufacturing is commonly known as 3D printing. One such process, commonly referred to as Fused Deposition Modeling (FDM), comprises a process of melting a thin layer of thermoplastic material, and applying this material in layers to produce a final part. This is commonly accomplished by passing a continuous thin filament of thermoplastic material through a heated nozzle, which melts and applies the material to the structure being printed. The heated material may be applied to the existing structure in thin layers, melting and fusing with the existing material to produce a solid finished product.

The filament used in the aforementioned process is generally produced using a plastic extruder, which is comprised of a specially designed steel screw rotating inside a heated steel barrel. Thermoplastic material, in the form of small pellets, can be introduced into one end of the rotating screw. Friction from the rotating screw, combined with heat from the barrel, softens the plastic, which is then forced under pressure through a small round opening in a die attached to the front of the extruder barrel. This extrudes a string of material which is cooled and coiled up for use in the 3D printer.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of large parts or a larger number of items.

In some instances, 3D printing a part may involve a two-step process. In some aspects, 3D printing may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

Print heads of additive manufacturing machines used to print thermoplastic material in relatively large beads generally include a vertically mounted extruder and a print nozzle to direct a round print bead downward onto a surface and/or onto a part being printed. In some cases, the flowable material, such as, e.g., molten thermoplastic material, may be infused with a reinforcing material (e.g., strands of fiber) to enhance the material's strength. The flowable material, while hot and pliable, may be deposited upon a substrate (e.g., a mold), and then pressed down, or otherwise flattened and/or leveled to a consistent thickness. These traditional print heads may include an oscillating plate surrounding the nozzle, the plate being configured to oscillate vertically to flatten the bead of material against the previous layer of material. The deposition process may be repeated so that each successive layer of flowable material is deposited upon an existing layer to build up and manufacture a desired structure for a component or part. In order to achieve proper bonding between printed layers, it may be necessary to ensure that the temperature of the previously-deposited layer is within a certain range. For example, the previously-deposited layer may need to have cooled to an appropriate degree and thereby solidified sufficiently to support the new layer. However, this previously-deposited layer may also be sufficiently warm to soften and fuse with the new layer, thus producing a solid part at the conclusion of the manufacturing process.

One industry that may benefit from additive manufacturing is boat-making. In recent years, boats have been constructed with components produced with the use of molds. These molds may be injected with reinforced plastic materials, such as fiberglass. The separate components formed with these molds may be joined together to form the finished boat. These boats are generally made of two major components, a hull and a deck. The hull may include or form the outside of the boat which floats in the water, while the deck may include or form the inside of the boat. In typical pleasure craft, the shape of the deck generally matches and follows the shape of the inside surface of the hull, to create an area where passengers can stand. Seats or other features may be molded into the deck. The boat is therefore constructed by firmly connecting the separate hull and the deck components together.

Fiberglass boats are traditionally manufactured by applying catalyzed fiberglass material to the inside of a mold. The mold may have a surface that matches the desired shape of the outside of the part. This material then hardens, and the resulting part, for example a boat hull, is removed from the mold.

Before a boat, such as a fiberglass boat, can be produced in this fashion, molds for the hull and deck are typically built. This is generally accomplished by making a pattern, which may be referred to as a "plug", which has the size and shape desired in the final component. Then, fiberglass can be applied to the plug. Once this fiberglass has hardened and is removed from the plug, the resulting fiberglass part forms a mold for that component.

Typically, these plugs are built up using wood, foam, and other materials in a relatively time consuming and expensive process which requires the performance of skilled craftsmen. This conventional process may require months, or even years, to complete. Also, for boats produced in this manner, two separate plugs are needed, one for the hull and one for the deck. Additionally, conventional construction processes can result in boat plugs that lack durability. In such plugs, wear and tear caused by the process of making molds can limit the number of molds that can be pulled from each plug before the plug deteriorates to the point the plug can no longer be used. This process can be improved by a large scale 3D printing process to produce a single plug for both the hull and deck.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An object of the present disclosure is an approach that uses a large-scale 3D printing process to manufacture boat plugs in a manner that is faster, less expensive, and may be performed by machinery, rather than by skilled craftsman. Additionally, this approach may produce a plug that is more durable than plugs formed by conventional processes.

This approach may use an additive manufacturing process, such as a 3D printing process, to print a hull and deck. The hull and deck may be manufactured as a single part having a shape that generally corresponds to the final boat. This printed structure may then be machined to a desired final size and shape using CNC machinery and subsequently mounted to a rotary support which suspends the part above the floor and allows the part to be rotated so that either the hull or the deck faces upward, as desired.

When the hull is facing upward, fiberglass may be applied and a mold for the hull produced from the printed plug. When the plug is rotated so that the deck is facing upward, fiberglass can be applied and a mold for the deck may be produced. In this way, a single plug can be used to produce both the hull and the deck.

Since the material used for printing the two-sided plug may be significantly more durable than the conventional material typically used to make boats plugs, the material for the two-sided plug can be used to produce considerably more molds without deteriorating. The 3D printing process and subsequent machining may be significantly faster than the traditional approach, reducing the amount of time required to make the plug.

It may also be possible to design features in the deck which cannot be easily printed as part of the initial print process. Alternatively, if desired, these features may instead be printed as separate items and then attached or bonded to the printed deck to produce a deck plug with any desired features.

In one aspect, an additive manufacturing method may include providing material to an extruder of an additive manufacturing apparatus, heating the material to form a flowable material, and depositing a first layer of the flowable material from a nozzle of the additive manufacturing apparatus to form part of a hull portion of a plug for a marine article. The method may also include depositing a second layer of the flowable material from the nozzle of the additive manufacturing apparatus to form part of a deck portion of the plug for the marine article.

In another aspect, a system for manufacturing a mold for a marine article may include a plug formed of a thermoplastic material, the plug including: a hull portion having a hull surface facing in a first direction and a deck portion formed integrally with the hull portion, the deck portion having a deck surface facing in a first direction opposite to the second direction, wherein the hull portion and the deck portion are each formed of a thermoplastic material. The system may also include a support configured to rotatably suspend the plug.

In yet another aspect, a method for manufacturing a mold may include providing material to an extruder of an additive manufacturing apparatus and heating the material to form a flowable material. The method may also include depositing the flowable material from a nozzle to form a plug including a hull portion and a deck portion, applying a plastic material to at least one of the hull portion and the deck portion of the plug, and forming a mold by allowing the plastic material to harden and removing the hardened plastic material from the plug.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via additive manufacturing or 3D printing techniques. Specifically, the methods and apparatus described herein may comprise an approach that uses a large scale 3D printing process for making boat plugs in a manner that is faster, less expensive, and that employs machinery to produce a more durable plug.

Figure 1:
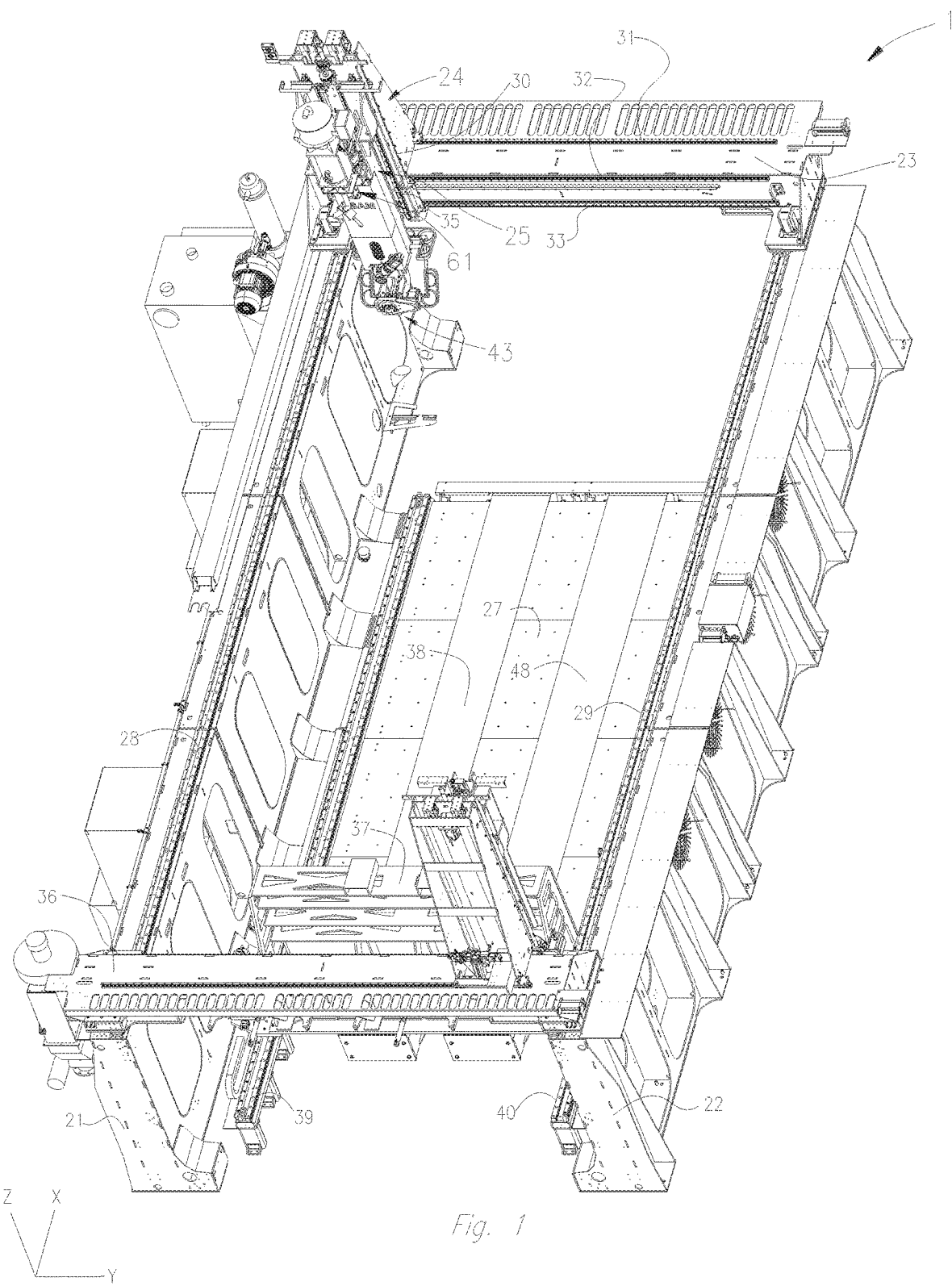
FIG. 1 is a perspective view of an exemplary additive manufacturing apparatus operable pursuant to an additive manufacturing process for forming articles, according to an aspect of the present disclosure.

Referring to FIG. 1, an additive manufacturing apparatus such as CNC machine 1 may include a bed framework having a pair of transversely spaced side walls 21 and 22, a printing gantry 23 and a trimming gantry 36, a carriage 24 mounted on printing gantry 23, a carrier 25 mounted on carriage 24, an extruder 61, and an applicator assembly 43 mounted on carrier 25. Printing gantry 23 and trimming gantry 36 may be supported on side walls 21 and 22. A horizontal worktable 27 having a support surfaced disposed in an x-y plane may be supported on the bed framework between side walls 21 and 22. Printing gantry 23 and trimming gantry 36 may be disposed so as to extend along a y-axis, supported at respective ends thereof on end walls 21 and 22. Printing gantry 23 and trimming gantry 36 may be movable with respect to an x-axis on a set of shared approximately parallel guide rails 28 and 29 provided on the upper ends of side walls 21 and 22. The printing gantry 23 and trimming gantry 36 may be displaceable by a one or more (e.g., a set of) servomotors mounted on the printing gantry 23 and trimming gantry 36, respectively. For example, printing gantry 23 and trimming gantry 36 may be operatively connected to tracks provided on the side walls 21 and 22. Carriage 24 may be supported on printing gantry 23 and provided with a support member 30 mounted on and displaceable along one or more guide rails 31, 32, and 33 provided on the printing gantry 23. Carriage 24 may be displaceable along a y-axis along one or more guide rails 31, 32, and 33 via a servomotor mounted on the printing gantry 23 and operatively connected to support member 30. Carrier 25 may be mounted on a set of spaced, vertically-disposed guide rails 35 supported on the carriage 24 for displacement of the carrier 25 relative to the carriage 24 along a z-axis. Carrier 25 may be displaceable along the z-axis via a servomotor mounted on the carriage 24 and operatively connected to the carrier 25. A vertical worktable 37 may be attached to one or more conveyor belts 38 and 48. Vertical worktable 37 may be supported on top of horizontal worktable 27, and may be displaceable along rails 39 and 40 along the x-axis by one or more servomotors connected to vertical worktable 37 and operatively connected to tracks provided on the top of the bed framework.

Figure 2:
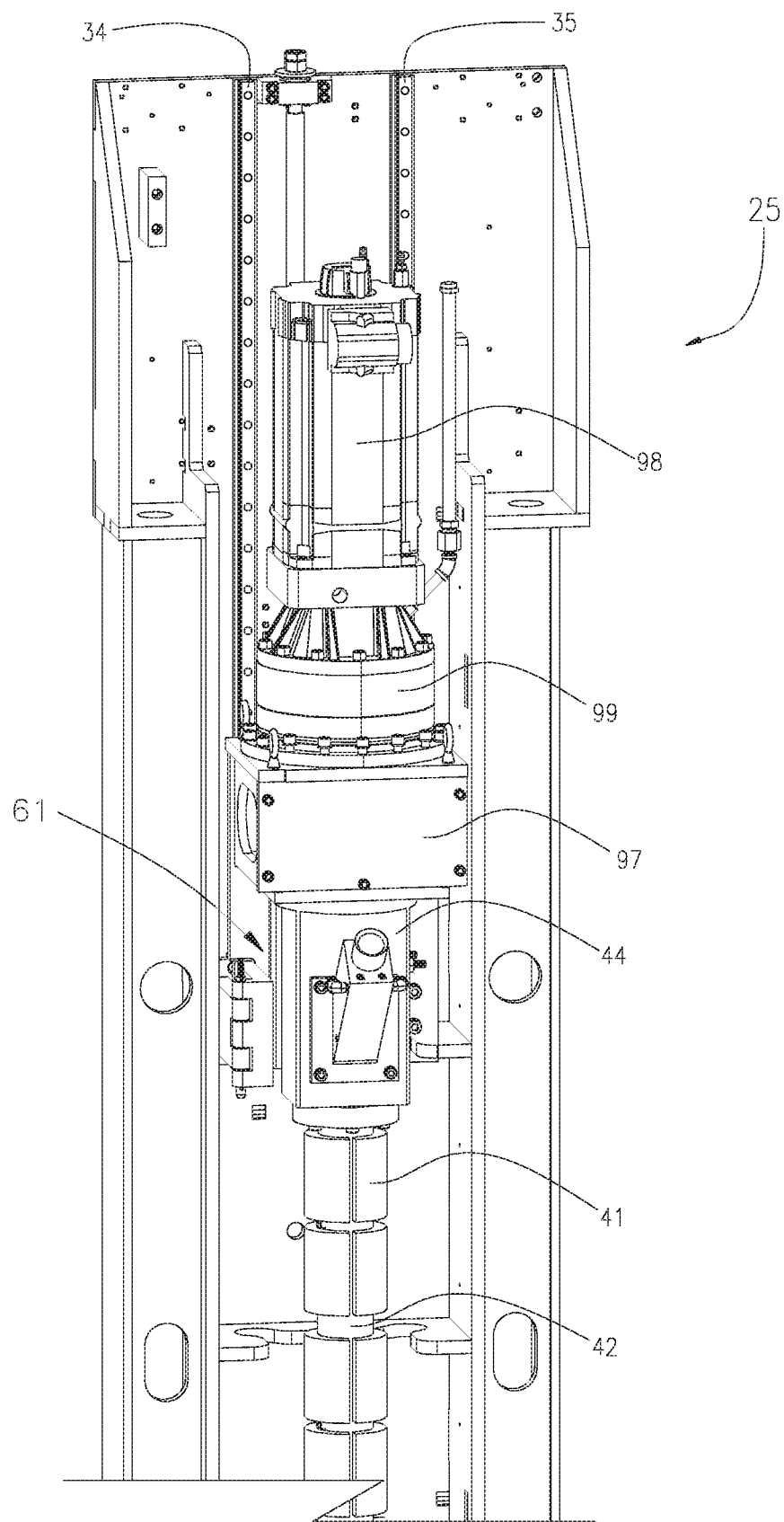
FIG. 2 is a perspective view of an exemplary carrier and extruder assembly of the exemplary additive manufacturing apparatus shown in FIG. 1.

As best shown in FIG. 2, extruder 61 may be mounted, in a linearly-movable manner, to carrier 25. In an exemplary configuration, extruder 61 may be movably mounted on a set of rails 34 and 35 and bearings (FIG. 1). A servomotor 98 may drive extruder 61 through a gearbox 99 attached to transition housing 97. Extruder 61 may receive thermoplastic pellets at the feed housing 44 so that the extruder screw transfers the thermoplastic material down through the barrel 42 where it is melted by the friction of the screw and heaters 41. This melted thermoplastic material may flow, via extruder 61, to positive displacement gear pump or melt pump 62 (FIG. 3).

Figure 3:
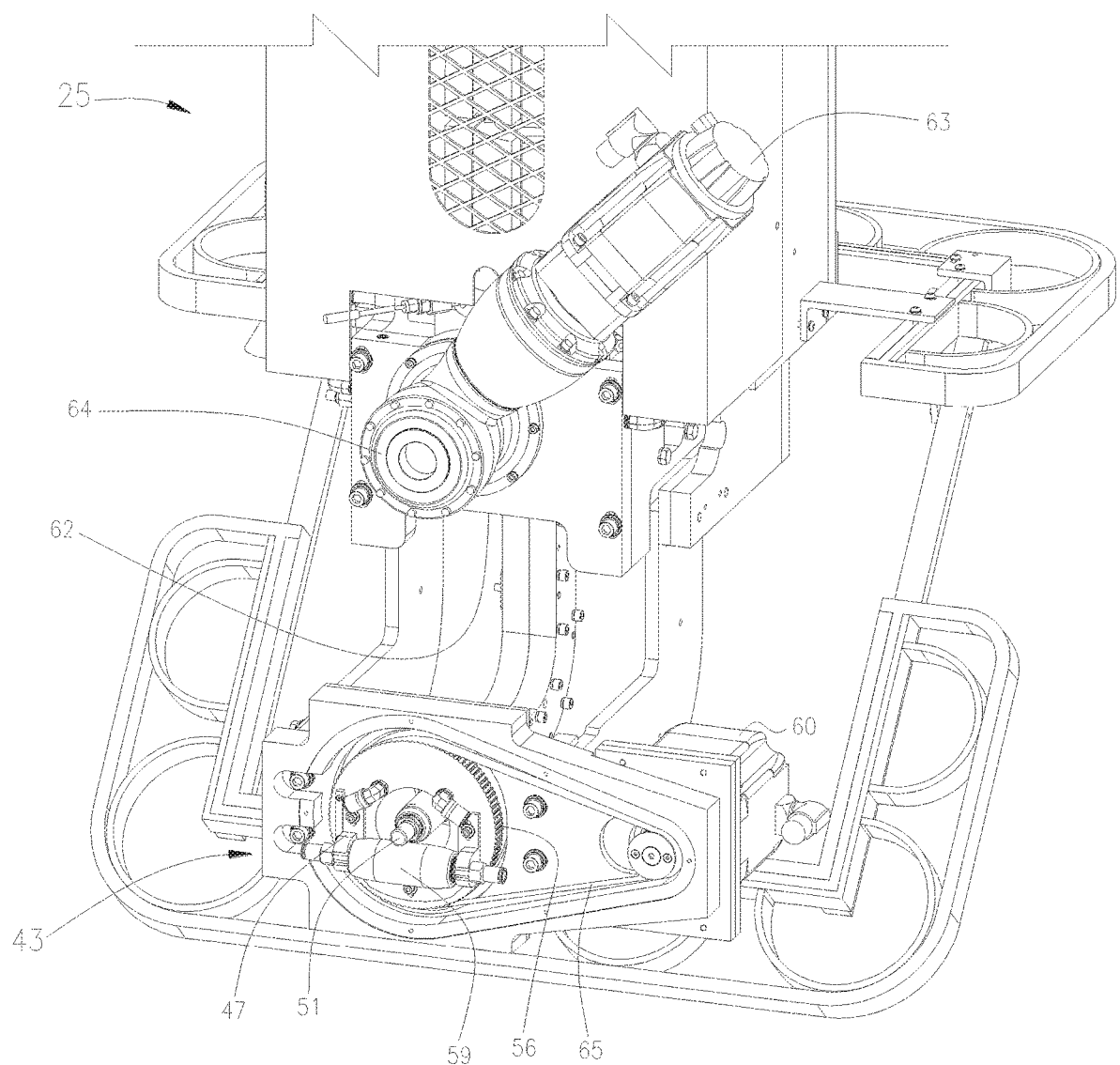
FIG. 3 is an enlarged perspective view of an exemplary carrier and applicator assembly of the exemplary additive manufacturing apparatus shown in FIG. 1.

As best shown in FIG. 3, gear pump 62 may be securely mounted to the bottom of carrier 25. Gear pump 62 may be driven by a servomotor 63 through a gearbox 64, and may receive molten plastic (e.g., thermoplastic material) from extruder 61 (FIG. 2), and meter out precise amounts of thermoplastic material at determined flow rates to nozzle 51 to print the part. An applicator head 43 may be attached at a location below gear pump 62. Applicator head 43 may include a bead shaping roller 59, rotationally mounted in carrier bracket 47. Roller 59 may provide a means for flattening and leveling an oversized bead of fluid material (e.g., molten thermoplastic) extruded out of nozzle 51. Carrier bracket 47 may be adapted to be rotationally displaced by means of a servomotor 60, through a pulley or sprocket 56 and belt or chain 65 arrangement.

Figure 4:
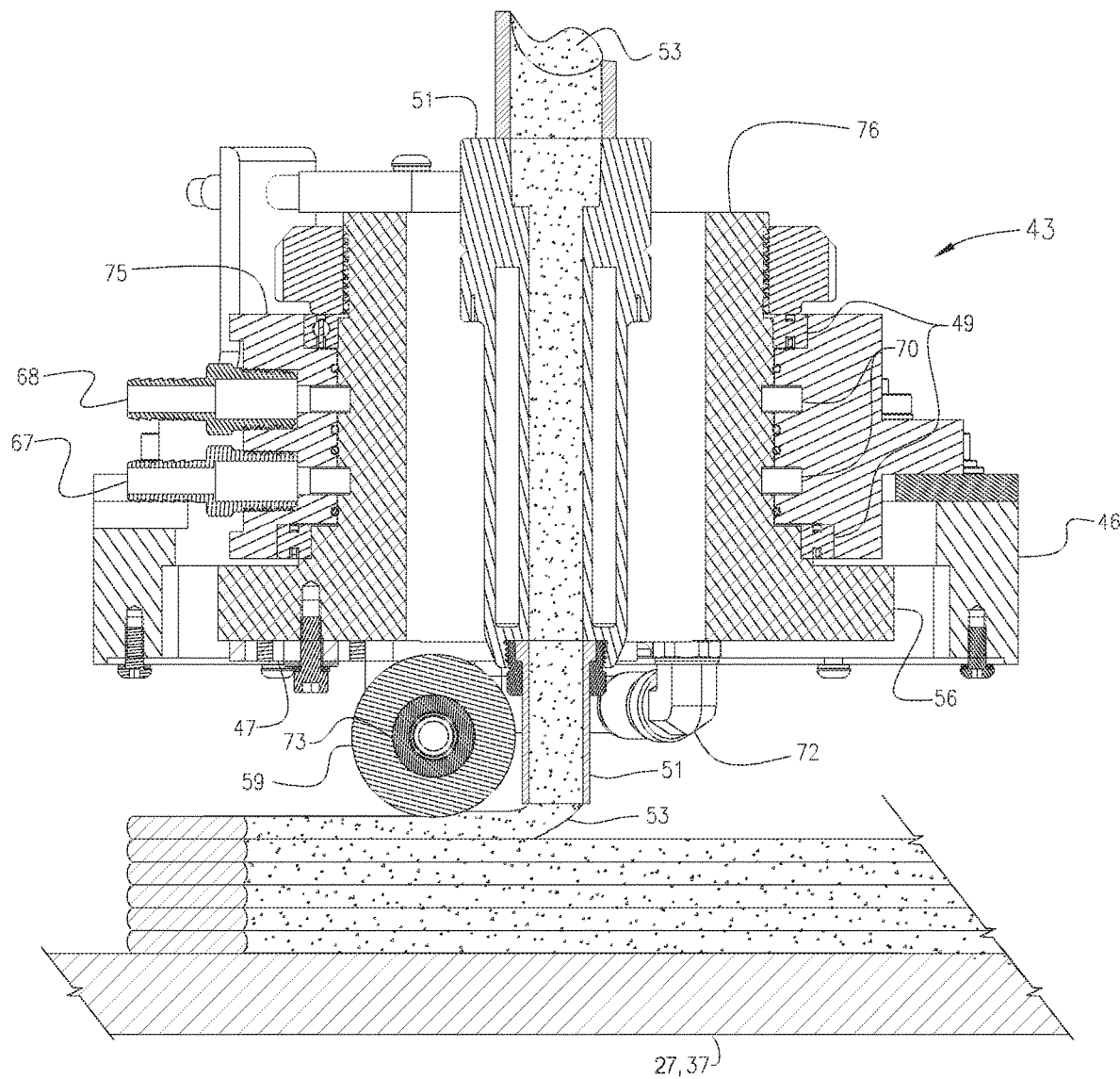
FIG. 4 is an enlarged cross-sectional view of the exemplary applicator head assembly shown in FIG. 3.

With reference to FIG. 4, application head 43 may include a housing 46 with rotary union mounted therein. Pulley or sprocket 56 may be machined into an inner hub 76 of the rotary union. Inner hub 76 may have an opening with a sufficiently large diameter to allow the heated print nozzle 51 to pass through. Inner hub 76 may rotate on a set of bearings 49 contained within the outer housing 75 of the rotary union. The compression roller assembly may be attached to the inner hub 76 of the rotary union so that the compression roller 59 rotates about the print nozzle 51. The rotary union may also contain barb fittings 67 and 68 ported into coolant passages 70 that encompass or surround inner hub 76 and the inside of outer housing 75 of the rotary union. The coolant passages 70 may extend to quick disconnect fittings 72 into an axle 73 of the compression roller 59.

With reference to FIGS. 2-4, an oversized molten bead of flowable material (e.g., molten thermoplastic) may be provided under pressure from a source disposed on carrier 25 (e.g., gear pump 62) or another source. The bead of flowable material may be provided to applicator head 43. Thus, gear pump 62, (or another source of flowable material), may be securely connected to, and in communication with, nozzle 51. In use, the flowable material 53 (e.g., thermoplastic material) may be heated sufficiently to form a large molten bead thereof, which may be extruded through applicator nozzle 51 to form large, uniform, and smooth rows of deposited material on surface 27. In some aspects, surface 27 may be a horizontally-extending surface (e.g., a surface that extends in an X-Y plane as shown in FIG. 1). In other aspects, a vertically-extending surface 37 (e.g., a surface that extends in an Y-Z plane as shown in FIG. 1) may used instead of, or in addition to, surface 27. As shown in FIG. 4, surfaces 27 and 37 are each suitable for receiving a bead of flowable material 53. Such beads of molten material may be flattened, leveled, and/or fused to adjoining layers by bead-shaping compression roller 59 with the layers forming 3D printed products, such as a plug for a boat. The use of roller 59 to flatten, level, and/or fuse layers may substantially eliminate the occurrence of trapped air between the adjoining layers.

Figure 5:
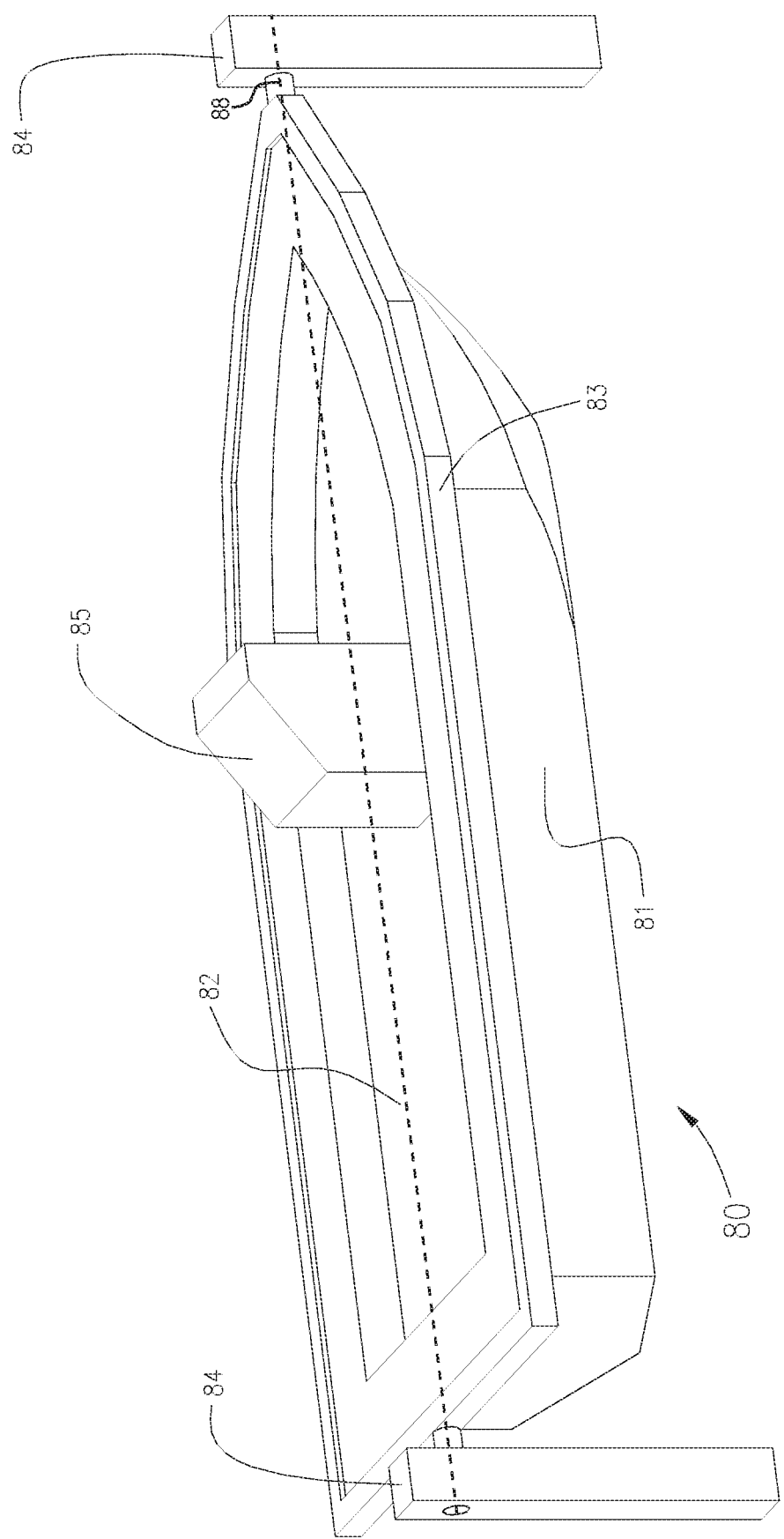
FIG. 5 is a perspective view of plug having hull and deck portions.

In one aspect, the additive manufacturing apparatus described with respect to FIGS. 1-4 may be configured to perform a 3D printing process to print a plug 80 shown in FIG. 5. In one aspect, plug 80 may be formed as a single integral part including both a hull 81 and deck 82. Plug 80 may be formed by printing a plurality of portions that are subsequently joined together to form a single part that includes both hull 81 and deck 82. These individual portions may be bonded, fused, or attached in any suitable manner. Whether plug 80 is formed during a single continuous printing process, or by bonding or otherwise joining a plurality of separately printed portions, plug 80 may have a shape that corresponds to the shape of the final boat as shown in FIG. 5. Plug 80 may be constructed by an additive manufacturing or 3D printing process such as a horizontal printing process in which nozzle 51 extends vertically or a vertical printing process in which nozzle 51 extends horizontally. When plug 80 is formed by joining two or more separate portions, each of these portions may be formed by either a horizontal or a vertical printing process. The machine shown in FIGS. 1-4 may be capable of forming plug 80 in a single continuous print operation, or in a plurality of separate print operations. Plug 80 may have a length or height that is larger than the length of horizontal worktable 27 by forming plug 80 with two or more portions produced by separate print operations with CNC machine 1. In some aspects, plug 80 may be constructed via 3D printing such that at least one first layer forms a part of hull portion 81 and at least one second layer forms a part of the deck portion 82. As understood, each of the hull 81 and deck 82 portions of plug 80 may include a plurality of layers of material 53 (see FIG. 3) that may be fused to form an integral body of plug 80. Once formed, plug 80 may be machined to a final size and shape using CNC machinery. With the use of the CNC machinery, the 3D printing process may be performed in a repeatable manner that is less reliant on the performance of skilled craftsmen. Once manufactured (printed, machined, and/or assembled, if necessary), plug 80 may be mounted to a plug support frame 83 which is connected to one or more floor support 84. When plug 80 is so connected to one or more floor supports 84, plug 80 may be suspended above the floor. Additionally, floor supports 84 may allow plug 80 to be rotated (e.g., about an axis 88) so that either the hull 81 or deck 82 faces upward. Fiberglass may be applied to plug 80 (e.g., on at least a portion of hull 81 and/or at least a portion of deck 82), to form a mold. As the plug is able to selectively rotate about axis 88, fiberglass may be applied with the plug 80 positioned at any desired angle, allowing the selection of the rotational position of hull 80 that is best adapted for a particular situation or portion of the process for creating the mold.

Figures 6A, 6B:
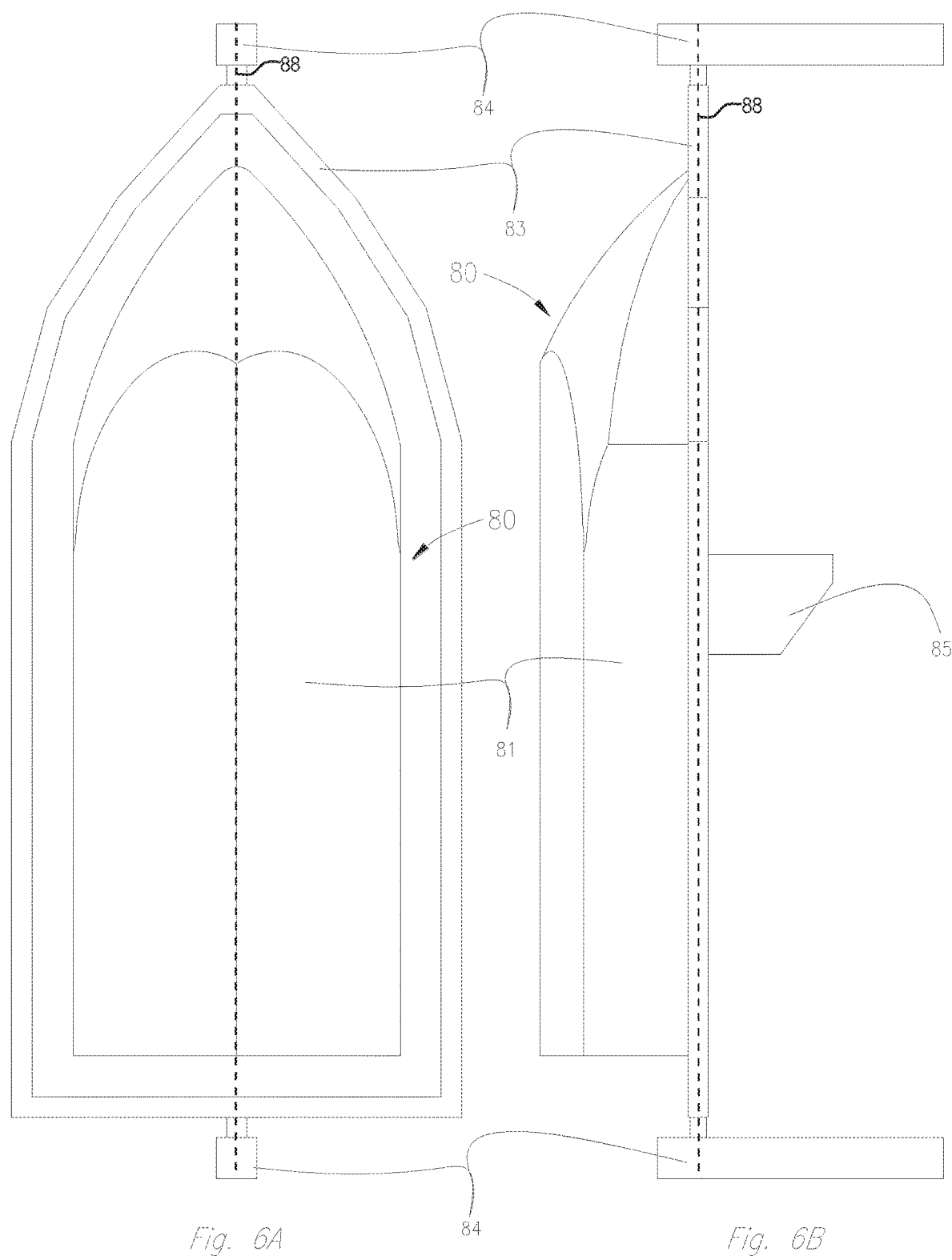
FIG. 6A is a top view of the plug of FIG. 5 with the hull facing upward.
FIG. 6B is a side view of the plug of FIG. 5 with the hull facing upward.
Figures 7A, 7B:
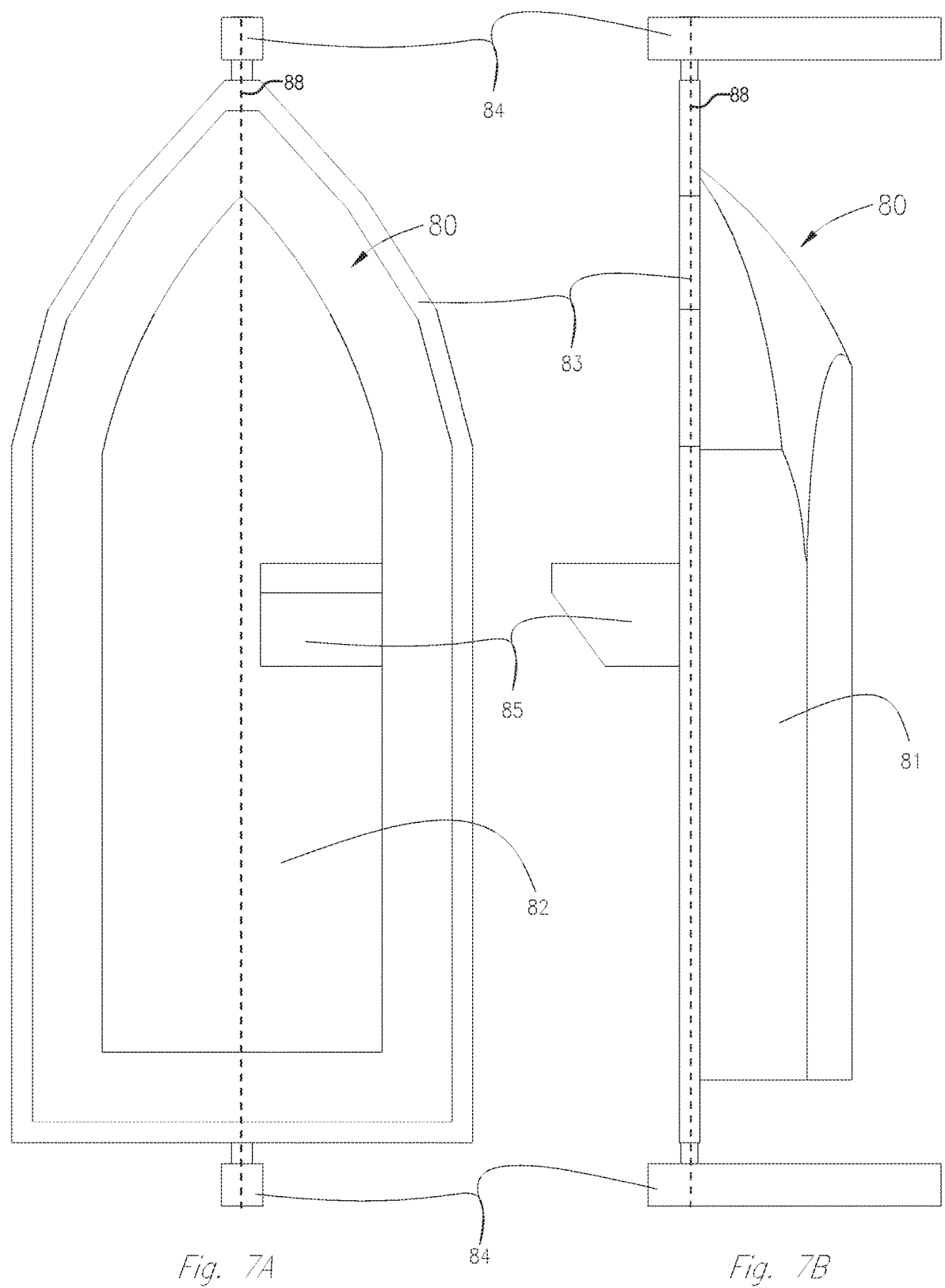
FIG. 7A is a top view of the plug of FIG. 5 with the deck facing upward.
FIG. 7B is a side view of the plug of FIG. 5 with the deck facing upward.

As shown in the top view of FIG. 6A and the side view of FIG. 6B, the hull 81 may be positioned (rotated to and secured in a first position) so as to face upward. With hull 81 positioned facing upwards, plastic, such as a plastic that includes include reinforcing fibers (e.g., fiberglass) may be applied to produce a mold for hull 81 from printed plug 80. Similarly, plug 80 may be rotated so that deck 82 faces upward (rotated to a second position), as shown in top view of FIG. 7A and side view of FIG. 7B. With the deck 82 facing upwards, plastic material such as fiberglass may be applied to produce a mold for the deck 82. The hull 81 and deck 82 of plug 80 may be formed with smooth or finished surfaces (e.g., polished and/or coated surfaces) for receiving the fiberglass material, thereby reducing or eliminating the need to machine a mold formed from the hull 81 or deck 82. In this way, a single plug 80 may be used to produce molds for both the hull and deck of a boat. Additionally, a single boat plug 80 may require less floor space than two or more separate boat plugs for the hull and for the deck, which may reduce costs associated with plug 80. Also, constructing a single boat plug 80 (e.g., by 3D printing) for both the hull and deck may be less expensive than preparing two or more separate plugs, further reducing costs associated with plug 80. Further, the material (e.g., thermoplastic material) used for the printing the two-sided plug 80 may be significantly more durable than materials such as wood, foam, etc. Therefore, plug 80 may be used to produce considerably more molds without deterioration as compared to plugs made of conventional materials. The 3D printing process and subsequent machining may be faster than traditional approaches, reducing the amount of time required to make the plug 80.

Figure 8:
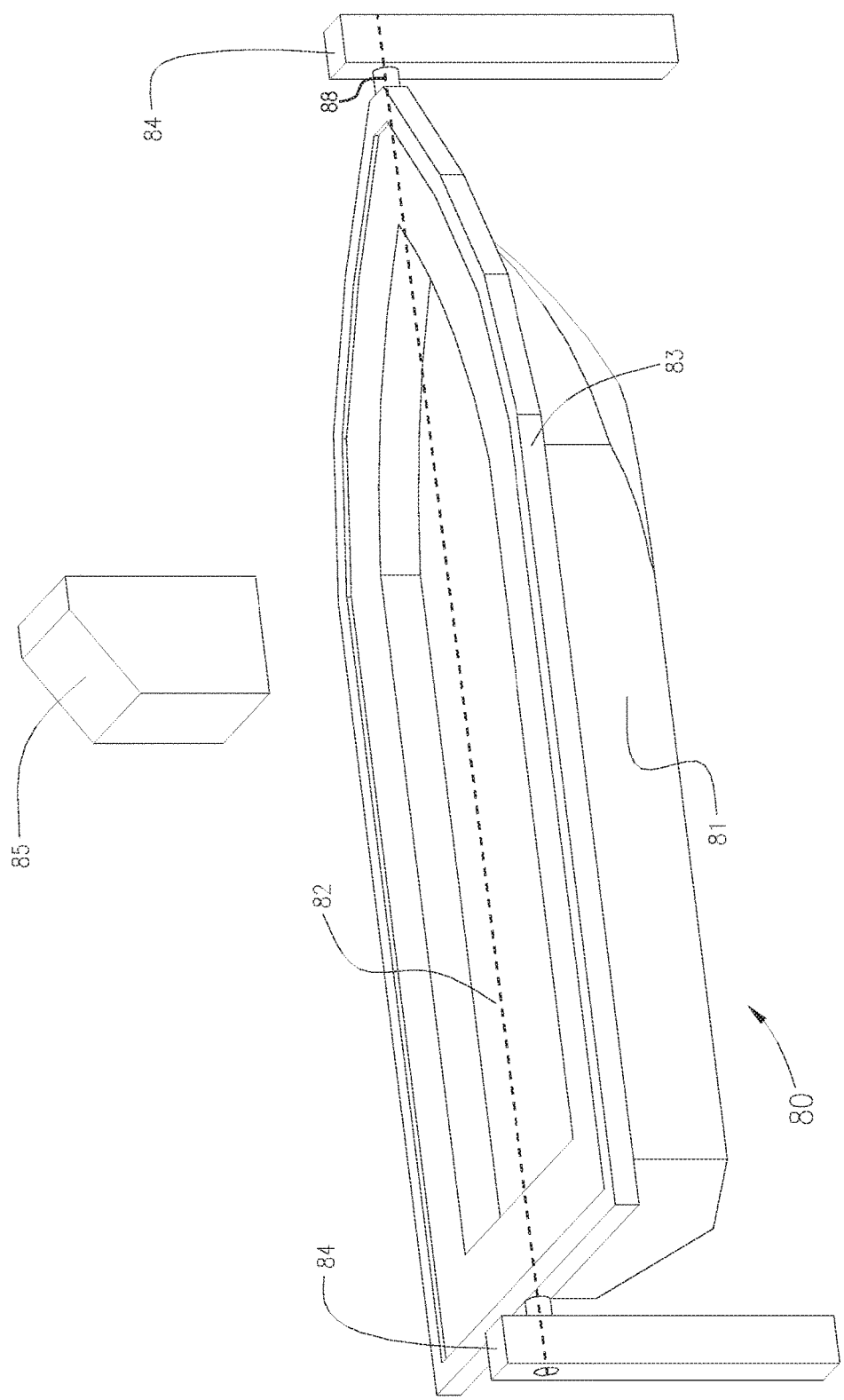
FIG. 8 is a perspective view of a plug with a separate console.

As shown in FIG. 5, it may be possible to provide features such as a console 85 in deck 82. In some aspects, it may be desirable to instead produce one or more features separately from plug 80, such as features that may be difficult to produce during an initial print process. Such features may, as represented by console 85 in FIG. 8, be produced separately (e.g., by an additive manufacturing process such as 3D printing, or by another process), and subsequently attached or bonded to the deck 82 to produce a deck plug with all the desired features.

From the foregoing detailed description, it will be evident that there are a number of changes, adaptations and modifications of the current disclosure which come within the province of those persons having ordinary skill in the art to which this disclosure pertains. For example, aspects of the current disclosure may be used to fabricate any marine vessel or boat of any shape and components. It is also contemplated that the current disclosure is used to fabricate other components (such as, for example, marine items or components, automobile parts, medical devices, machine components, consumer products, etc.). It is intended that all such variations not departing from the spirit of the disclosure be considered as within the scope thereof as limited by the appended claims.

What is claimed is:

1. An additive manufacturing method, comprising:
   providing material to an extruder of an additive manufacturing apparatus;
   heating the material to form a flowable material;
   depositing a first layer of the flowable material from a horizontally-facing opening of a nozzle of the additive manufacturing apparatus to form part of a hull portion of a plug for a mold of a marine article;
   depositing a second layer of the flowable material from the horizontally-facing opening of the additive manufacturing apparatus to form part of a deck portion of the plug for the mold of the marine article, wherein the deck portion comprises one or more recessed surfaces and one or more protruded features having a shape corresponding to an inside of a boat; and
   machining the hull portion and the deck portion with the additive manufacturing apparatus.

2. The additive manufacturing method of claim 1, wherein the plug includes an integral body including the hull portion and the deck portion.

3. The additive manufacturing method of claim 1, further including securing the plug to at least one support such that the plug is rotatable.

4. The additive manufacturing method of claim 1, further including:
   rotating the plug to a first position in which the hull portion faces upward; and
   rotating the plug in a second position in which the deck portion faces upward.

5. The additive manufacturing method of claim 4, further including applying a fiberglass material while the plug is positioned in the first position or in the second position to form at least a portion of a mold.

6. The additive manufacturing method of claim 1, wherein the hull portion includes a finished surface that faces a first direction and the deck portion includes a finished surface that faces in a second direction that is opposite with respect to the first direction.

7. The additive manufacturing method of claim 1, wherein the first layer and the second layer are deposited with a moveable printing gantry of the additive manufacturing apparatus and are machined with a moveable trimming gantry of the additive manufacturing apparatus.

8. The additive manufacturing method of claim 7, wherein the printing gantry and the trimming gantry are moveable to opposite ends of the additive manufacturing apparatus.

9. A system for manufacturing a mold for a marine article, the system comprising:
   a plug formed of a thermoplastic material, the plug including:
      a hull portion having a hull surface facing in a first direction; and
      a deck portion formed integrally with the hull portion, the deck portion comprising one or more recessed surfaces and one or more protruded features having a shape corresponding to an inside of a boat and having a deck surface facing in a second direction opposite to the first direction, wherein the hull portion and the deck portion are each formed of a thermoplastic material;
   one or more floor supports;
   a plug support frame rotatably mounted to the one or more floor supports; and an additive manufacturing apparatus configured to deposit layers of the thermoplastic material from a horizontally-facing opening of a nozzle and configured to machine the deposited layers of the hull portion and the deck portion to form the plug.

10. The system of claim 9, wherein the one or more floor supports rotatably support the plug such that the plug is rotatable to a first position in which the deck surface faces upward, and rotatable to a second position in which the hull surface faces upward.

11. The system of claim 9, wherein the additive manufacturing apparatus includes a vertical worktable.

12. The system of claim 9, wherein the additive manufacturing apparatus includes a horizontally-extending nozzle.

13. The system of claim 9, wherein the plug is an integral structure formed by layers of the thermoplastic material deposited by the additive manufacturing apparatus.

14. A method for manufacturing a mold, comprising:
providing material to an extruder of an additive manufacturing apparatus;
heating the material to form a flowable material;
depositing the flowable material from a horizontally-facing opening of a nozzle of the additive manufacturing apparatus and trimming the deposited material with the additive manufacturing apparatus to form a plug including a hull portion and a deck portion, wherein the deck portion comprises one or more recessed surfaces and one or more protruded features having a shape corresponding to an inside of a boat;
applying a plastic material to at least one of the hull portion or the deck portion of the plug; and
forming a mold by allowing the plastic material to harden and removing the hardened plastic material from the plug.

15. The method of claim 14, wherein the plastic material includes reinforcing fibers.

16. The method of claim 14, wherein trimming the plug is performed before applying the plastic material.

17. The method of claim 14, further including rotatably supporting the plug while applying the plastic material.

18. The method of claim 17, wherein the plastic material is applied to the hull portion while the plug is in a first position, and wherein the method includes rotating the plug to a second position and applying the plastic material to the deck portion while the plug is in a second position.

19. The method of claim 14, wherein the mold is configured to produce at least one of a hull portion or a deck portion of a boat by applying the plastic material to the at least one of the hull portion or the deck portion of the plug.

20. The method of claim 14, wherein the plastic material is applied to the hull portion while the hull portion faces upward and the deck portion faces downward.

* * * * *